United States Patent [19]
Muroi et al.

[11] Patent Number: 5,448,628
[45] Date of Patent: Sep. 5, 1995

[54] PUBLIC TELEPHONE SYSTEM

[75] Inventors: Junichi Muroi; Tatsumi Takagi; Nobuo Suzuki, all of Tokyo; Shigekazu Sakata; Hideyuki Oikawa, both of Saitama, all of Japan

[73] Assignees: Tamura Electric Works, Ltd.; Kokusai Denshin Denwa Co. Ltd., Tokyo, Japan

[21] Appl. No.: 233,699

[22] Filed: Apr. 26, 1994

[30] Foreign Application Priority Data

Apr. 27, 1993 [JP] Japan .................. 5-122104

[51] Int. Cl.6 .................. H04M 15/00; H04M 17/00
[52] U.S. Cl. .................. 379/132; 379/143; 379/155
[58] Field of Search ............... 379/123, 132, 143, 144, 379/155

[56] References Cited

U.S. PATENT DOCUMENTS 5,222,122  6/1993  Hamilton et al. .................. 379/32

Primary Examiner—Stephen Chin
Assistant Examiner—Kevin Kim
Attorney, Agent, or Firm—Graham & James

[57] ABSTRACT

A public telephone system includes a plurality of public telephone sets and a center apparatus. Each public telephone set includes a memory for storing a current tariff table used in the speech communication service and a revised tariff table including the tariff information from the center apparatus, a first timepiece unit for setting the time information from the center apparatus to perform a time counting operation, a first data memory for storing the change time information from the center apparatus, a determining unit for determining whether a current time counted by the first timepiece unit reaches a change time stored in the first data memory at a time of call originating, and a tariff processing unit for referring to the current tariff table in the memory to perform the tariff processing when the current time does not reach the change time and referring the revised tariff table in the memory as the current tariff table to perform the tariff processing when the current time reaches the change time on the basis of an output from the determining unit.

9 Claims, 4 Drawing Sheets

PUBLIC TELEPHONE SYSTEM

BACKGROUND OF THE INVENTION

The present invention relates to a public telephone system comprising a public telephone set (to be referred to as a telephone set hereinafter) and a center apparatus, in which a tariff table of the telephone set is revised by tariff change designation from the center apparatus.

To change tariffs in a conventional public telephone system of this type, data such as tariffs to be revised or corresponding telephone numbers is converted into DTMF (Dual Tone Multi Frequency) signals and transmitted from a center apparatus to each telephone set at a predetermined time for change. Each telephone set receives and stores these tariff data in an internal memory. At the same time, subsequent speech communication in each telephone set is charged in accordance with tariff data of a new tariff system.

In the conventional public telephone system, when the time for change of the tariffs is reached, the tariff data to be revised is transmitted from the center apparatus to each telephone set. In this case, since the center apparatus must transmit the tariff data to a large number of telephone sets, the telephone sets cannot be simultaneously changed to a new tariff system. Therefore, during change operation of the tariffs, speech communication in a given telephone set is charged in accordance with the new tariff system while that in another telephone is charged in accordance with the old tariff system.

SUMMARY OF THE INVENTION

It is an object of the present invention to provide a public telephone system for simultaneously changing the tariff system for a large number of telephone sets.

In order to achieve the above object, there is provided a public telephone system comprising a plurality of public telephone sets for performing tariff processing as tariff payment processing for a speech communication service in accordance with tariff data obtained on the basis of a calling dial number, and a center apparatus for transmitting time information, revised tariff information, and change time information to the public telephone sets through a telephone line, each of the public telephone sets comprising memory means for storing a current tariff table used in the speech communication service and a revised tariff table constituted by the tariff information from the center apparatus, first timepiece means for setting the time information from the center apparatus to perform a time counting operation, a first data memory for storing the change time information from the center apparatus, determining means for determining whether a current time counted by the first timepiece means reaches change time stored in the first data memory at the time of a call originating operation, and tariff processing means for referring to the current tariff table in the memory means to perform the tariff processing when the current time does not reach the change time and referring the revised tariff table in the memory means as the current tariff table to perform the tariff processing when the current time reaches the change time on the basis of an output from the determining means.

DESCRIPTION OF THE PREFERRED EMBODIMENT

Figure 1:
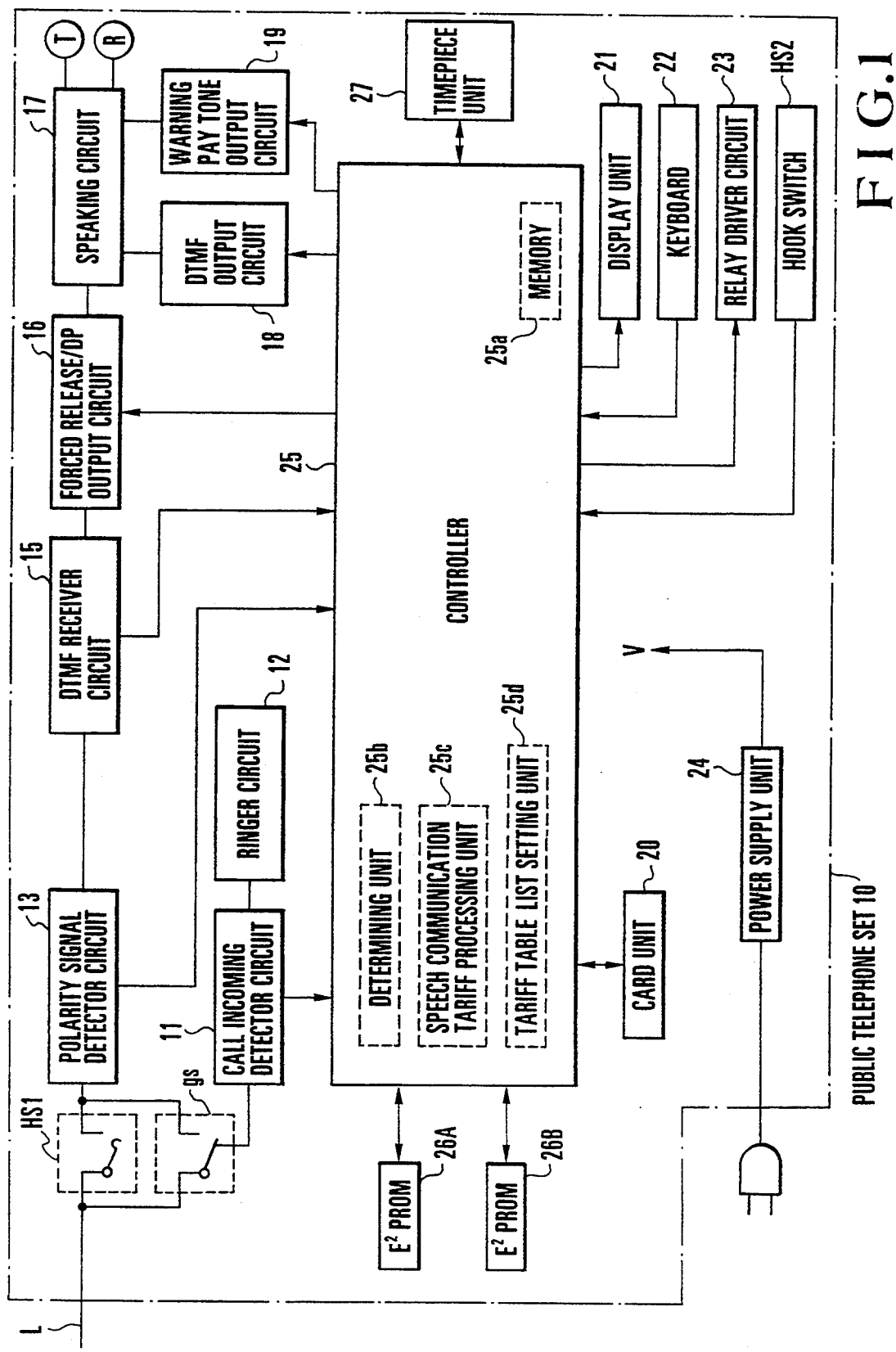
FIG. 1 is a block diagram showing a public telephone set constituting a public telephone system according to an embodiment of the present invention.
Figure 2:
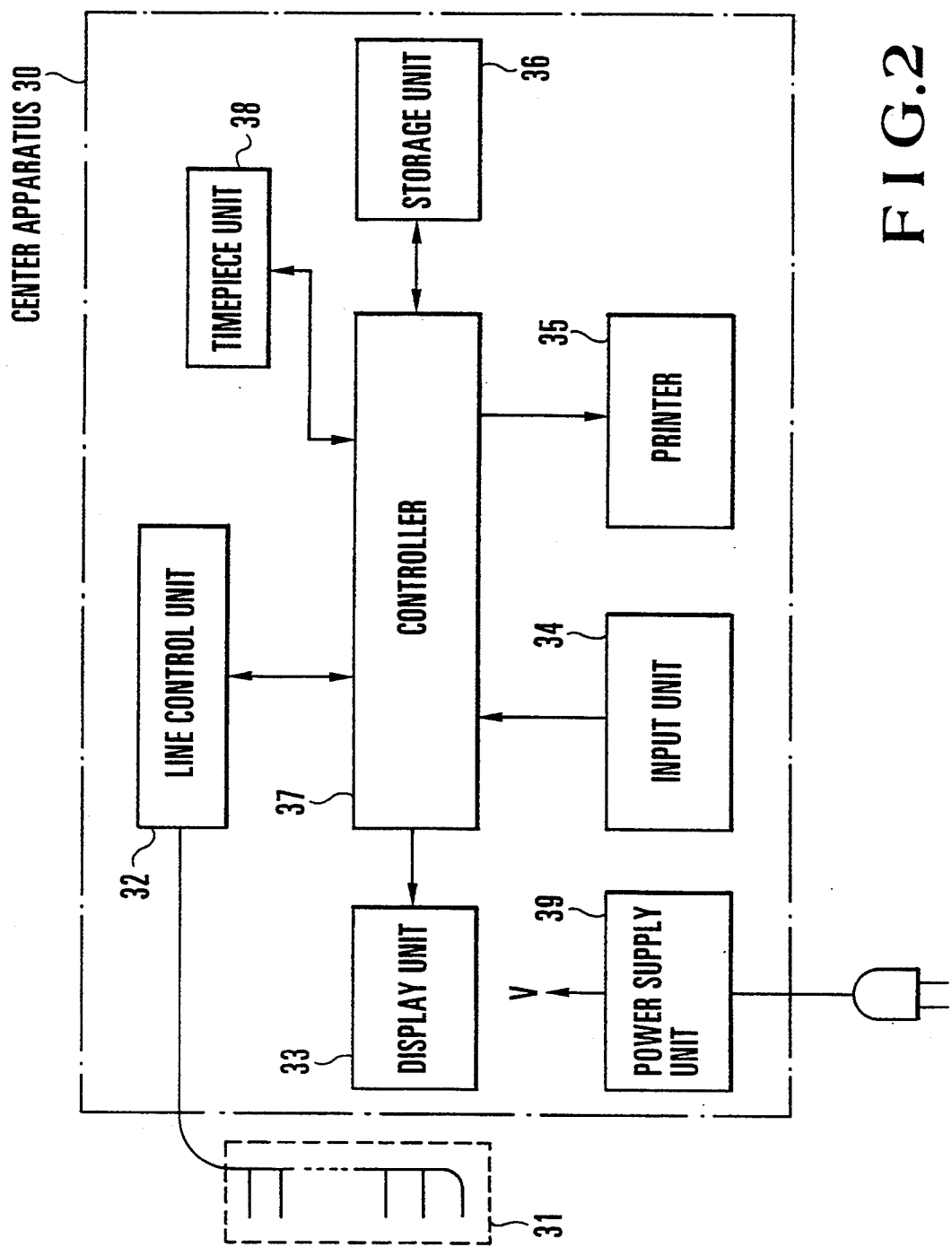
FIG. 2 is a block diagram showing a center apparatus constituting the public telephone system according to the embodiment of the present invention.

FIGS. 1 and 2 show a public telephone system according to an embodiment of the present invention. FIG. 1 shows a public telephone set 10 constituting a public telephone system, and FIG. 2 shows a center apparatus. Referring to FIG. 1, reference numeral 11 denotes a call incoming detector circuit for detecting a call incoming to a telephone line (to be referred to as a line hereinafter) L; 12, a ringer circuit connected to the call incoming detector circuit 11 to perform a call incoming operation and ringing in accordance with a call incoming signal; 13, a polarity signal detector circuit for detecting the polarity of the line L which is caused by a response of a partner; 15, a DTMF receiver circuit for receiving a DTMF signal as various data to the line L; 16, a forced release/DP output circuit for forcibly releasing the loop of the line L and at the same time outputting a DP signal to the line L; 17, a speaking circuit having a transmitter T and a receiver R; 18, a DTMF output circuit for outputting a DTMF signal as a dial selection signal to the line L; 19, a warning pay tone output circuit for outputting a warning pay tone when the prepaid balance becomes zero; 20, a card unit for performing various processes for a prepaid card or the like storing prepaid value information and inserted to pay a tariff; 21, a display unit for displaying the balance information of the prepaid card or the like; 22, a keyboard including dial keys; 23, a relay driver circuit for driving a relay GS (not shown); 24, a power supply unit for applying a power supply voltage to each part of the telephone set; 25, a controller for controlling the entire telephone set 10; 26A and 26B, electrically erasable and programmable $E^2$PROMs for alternately storing current and revised tariff tables; 27, a timepiece unit for counting the current time. Reference symbol HS1 and HS2 denote hook switches; and gs, a contact of the relay GS.

The controller 25 has a memory 25a, a determining unit 25b, a tariff processing unit 25c, and a tariff table setting unit 25d. The memory 25a stores change time information, and reference information representing which one of the $E^2$PROMs 26A and 26B is accessed as a current tariff table. The determining unit 25b determines whether the current time counted by the timepiece unit 27 reaches the change time stored in the memory 25a. The tariff processing unit 25c refers to the current tariff table stored in the $E^2$PROM 26A or 26B to read the tariff data and performs the tariff processing on the basis of the readout tariff data. The tariff table setting circuit 25d sets the revised tariff table in the $E^2$PROM 26A or 26B on the basis of the reference information stored in the memory 25a. The tariff data comprises an initial speech communication charge data and a speech communication charge data per unit speech communication time or a speech communication time per unit speech communication charge data. Note that the memory 25a may be prepared as memories for respectively storing the change time information and the reference information.

When the change data of the time information and the tariff is transmitted as a DTMF signal from a center apparatus 30 (to be described later), the DTMF receiver circuit 15 in the telephone set 10 receives the change data, and the controller 25 sets the received change data in the timepiece unit 27 and the E$^2$PROM 26A or 26B. When the change time information of the tariff table is received from the center apparatus 30, the controller 25 stores the information in the memory 25a. In the call originating operation, a prepaid card is inserted into the card unit 20 after an off-hook operation, and a dial number is input. The controller 25 then selects, for example, whether the current tariff table stored in one of the E$^2$PROMs 26A and 26B is referred to or a revised tariff table stored in the other one of the E$^2$PROMs 26A and 26B is referred to as a current tariff table on the basis of the change time information stored in the memory 25a, thereby determining the tariff from the input dial number.

Referring to FIG. 2, the center apparatus 30 is constituted by a line control unit 32 for performing call originating control and call incoming control for a line group 31, a display unit 33 for monitoring input information or the like and displaying various information during communication with the telephone sets, an input unit 34 such as a keyboard for inputting various information such as time information, tariff information, and change time information, a printer 35 for printing out information, a storage unit 36 for storing the tariff information and the change information from the input unit 34, a controller 37 for performing input processing of various information and communication control with the telephone sets, a timepiece unit 38 for setting the current time by time information from the input unit 34 to perform a time counting operation, and a power supply unit 39.

To change the tariff system for a large number of telephone sets, the center apparatus 30 transmits time information to each telephone set to set time, and at the same time, transmits tariff data to be changed to each telephone set. The center apparatus 30 then transmits change time information representing a timing for actually changing the tariff system to each telephone set. Since the change time information is transmitted to each telephone set in advance, the tariff system for the telephone sets can be simultaneously changed without any contradiction.

Figure 3:
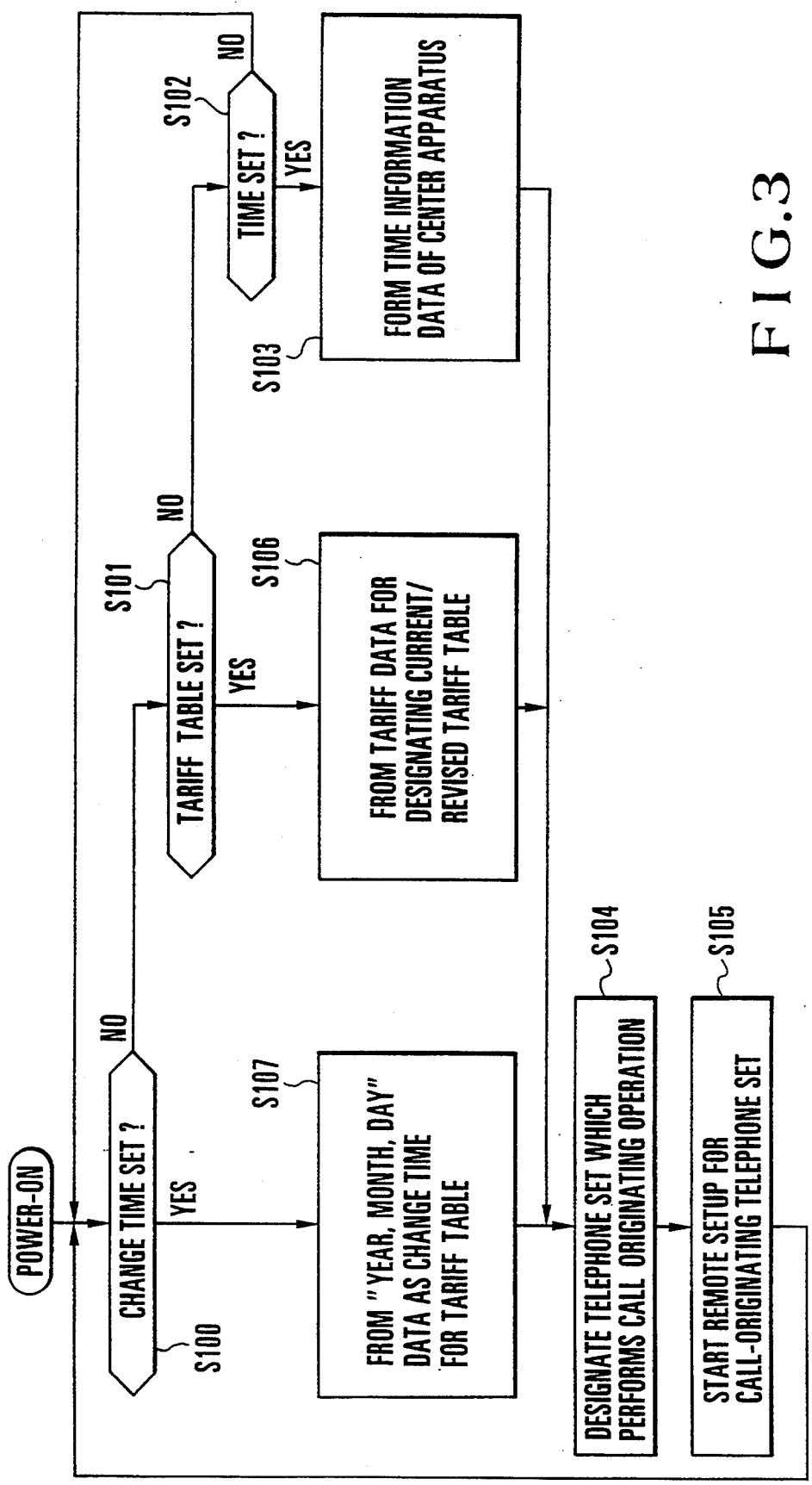
FIG. 3 is a flow chart showing the operation of the center apparatus in FIG. 2.

FIG. 3 shows the operation of the center apparatus 30, and more particularly the operation of the controller 37 for transmitting the change data to each telephone set at the time of revising the tariff system. More specifically, when the center apparatus 30 is powered on, and the controller 37 is started, the controller 37 detects input information by the operation of the input unit 34 and sequentially determines "Change Time Set?" in step S100, "Tariff Table Set?" in step S101, and "Time Set?" in step S102 on the basis of the detected information.

If YES in "Time Set?" of step S102, the controller 37 reads out the current time from the timepiece unit 38 to form time information data in step S103, designates the telephone set to be called in step S104, and at the same time, starts remote setup for transmitting the time information to the telephone set to set the time in step S105.

In this case, to set accurate time in the telephone set, the time information to be set is corrected with a time required for transmission in advance. When the information is to be sent to the next telephone set, the flow returns to step S103, and the controller 37 reads out the latest time information from the timepiece unit 38 and transmits it.

If the input information from the input unit 34 represents "Tariff Table Set?", and the controller 37 determines to be YES in step S101, the controller 37 detects the input information from the input unit 34 in step S106 and forms new tariff data to change the designated tariff data in the current tariff table (tariff table) provided to each telephone set. The flow advances to step S104, and the controller 37 designates the telephone set to be called in step S104. In step S105, the controller 37 performs the call originating operation to the designated telephone set and at the same time transmits the formed new tariff data to start remote setup. Upon completion of the remote setup, the next telephone set is repeatedly designated, and the same tariff data is transmitted.

If the input information from the input unit 34 represents "Change Time Set?", and the controller 37 determines to be YES in step S100, the controller 37 detects the input information from the input unit 34 to form "Year, Month, Day" data as change time data for the current and revised tariff tables provided to each telephone set in step S107. The flow advances to step S104, and the controller 37 designates the telephone set to be called, and at the same time transmits the formed change time data to start remote setup in step S105. Upon completion of the remote setup, the next telephone set is repeatedly designated, and the same change time data is transmitted. When the change time data is transmitted to each telephone set, the telephone set determines, for example, the timing for changing the current tariff table to the revised tariff table on the basis of this change time when the tariff during speech communication is calculated.

Figure 4:
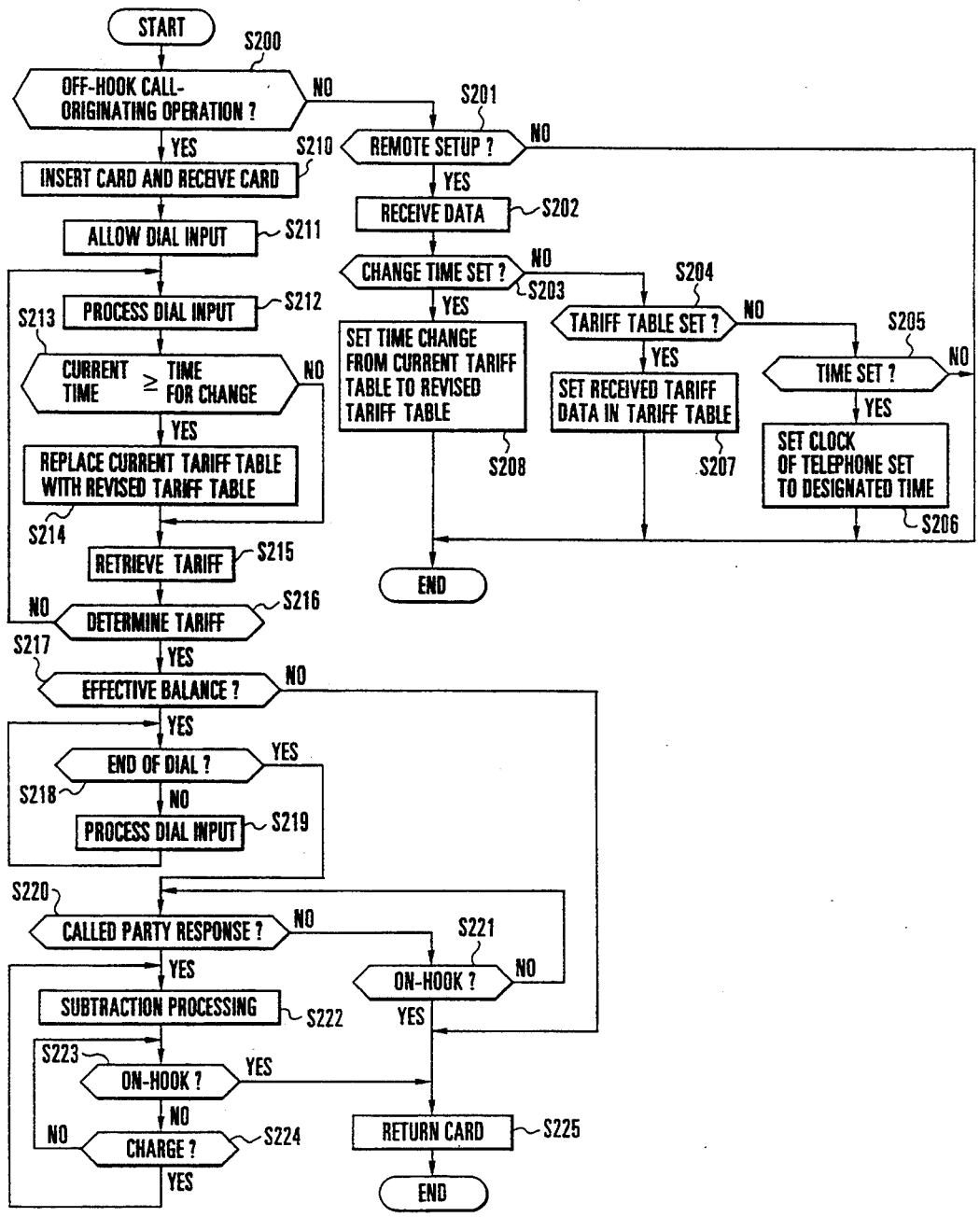
FIG. 4 is a flow chart showing the operation of the public telephone set in FIG. 1.

FIG. 4 shows the operation of the controller 25 in the telephone set 10 responding to the operation of the center apparatus 30. In a starting state, the controller 25 consistently monitors outputs from the hook switch HS2 to detect an off-hook state for call originating operation (step S200) and at the same time, consistently monitors outputs from the call incoming detector circuit 11 to detect call incoming. When a call incoming signal from the center apparatus 30 is detected by the call incoming detector circuit 11, the controller 25 drives the relay driver circuit 23 to operate the relay GS to close the relay contact gs, thereby forming a station loop. When the controller 25 determines to be YES in "Remote Setup?" of step S201 after a control signal is received from a caller through the line L, the controller 25 receives data from the center apparatus 30 in step S202 and determines the type of the received data in steps S203, S204, and S205.

If the received data is time information representing time setting, and the controller 25 determines to be YES in step S205, the controller 25 sets the designated time from the received time information to the timepiece unit 27 in step S206. If the received data represents the tariff table setting data, and the controller 25 determines to be YES in step S204, the tariff table setting unit 25d sets the received data to the revised tariff table in step S207. That is, when the current tariff table is stored in the E$^2$PROM 26A on the basis of the correlation information stored in the memory 25a, the received data is set in the E²PROM 26B as the revised tariff table. At this time, the controller 25 stores correlation information between the E²PROMs 26A and 26B and the current and revised tariff tables in the memory 25a. If the received data is change time setting information, and the controller 25 determines to be YES in step S203, the controller 25 sets the change time for the current and revised tariff tables in the memory 25a in step S208.

As described above, after the change time of the tariff is set in the telephone set 10, and an off-hook operation is performed for call originating, the controller 25 detects this operation through the hook switch HS2 to determine to be YES in "Off-Hook Call-Originating Operation?" of step S200. In this case, the controller 25 receives the prepaid card inserted into the card unit 20 in step S210. At the same time, if the received prepaid card is normal and stores value information, the controller 25 allows dial input in step S211. Subsequently, the controller 25 performs the dial input processing of dial information from the keyboard 22 in step S212 and drives the forced release/DP output circuit 16 to output a DP signal to the line L. On the other hand, the controller 25 retrieves the tariff table to calculate the autonomously charged tariff data on the basis of the input dial number.

Before the tariff table retrieval, the determining unit 25b reads out the time information of the timepiece unit 27 to determine whether the current time reaches the change time for the tariff table stored in the memory 25a in step S213. If the current time does not reach the change time, the tariff processing unit 25c reads out the current tariff table in the E²PROM 26A on the basis of the correlation information between the tariff table stored in the memory 25a and the E²PROM. On the other hand, if the current time reaches the change time, the tariff processing unit 25c performs tariff retrieval using the revised tariff table stored in the E²PROM 26B as the current tariff table on the basis of the correlation information in step S215. In step S216, the controller 25 determines whether or not tariff is determined. If the tariff is not determined because of the short digits of the input dial number, the flow returns to step S212 to perform the dial input processing again, and the dial signal continues to be output to the line L.

If a dial number having a predetermined number of digits is input, and the controller 25 determines to be YES in "Determine Tariff?" of step S212, the tariff processing unit 25c determines whether a balance corresponding to the tariff based on the input dial number remains in the inserted prepaid card, i.e., "Effective Balance?" in the prepaid card in step S217. If the input dial number represents, for example, long-distance speech communication, and no balance corresponding to this tariff is determined to remain in the prepaid card, the flow advances to step S225 to return the prepaid card.

On the other hand, if an effective balance remains in the prepaid card, and the controller 25 determines to be YES in step S217, the controller 25 determines "End Of Dial?" in step S218. If YES in step S218, a partner telephone set is called by the dial signal output to the line L. The controller 25 determines "Called Party Respond?" in step S220 or "On-Hook" in step S221. If the response of the partner telephone set is detected, and the controller 25 determines to be YES in step S220, subtraction processing for the balance in the prepaid card is performed in step S222. During speech communication, the controller 25 determines whether an on-hook operation is performed or the speech communication is charged in steps S223 and S223. When the speech communication continues to reach the timing of charge, the flow returns to step S222 to perform the subtraction processing for the balance in the prepaid card. When the speech communication is ended and an on-hook operation is performed, the prepaid card is returned in step S225. If an on-hook operation is detected due to non-response of the partner although the partner is called, the controller 25 determines to be YES in step S221. In this case, the card is returned in step S225.

As described above, to change the tariff for a large number of telephone sets, the center apparatus 30 first transmits the time information to each telephone set to set the time, and at the same time, transmits the tariff data to be changed to each telephone set. Subsequently, the change time information for actual tariff change is transmitted to each telephone set in advance. Since the change time information is transmitted to each telephone set in advance as described above, a disadvantage during the changing operation, in which charging in accordance with a new tariff system is performed in a given telephone while charging in accordance with the old tariff system is performed in another telephone set, is eliminated, and the tariff can be simultaneously changed for all the telephone sets.

In the above embodiment, the center apparatus 30 individually transmits the time information, the tariff information, and the change time information to the telephone set 10. However, two or more pieces of information may be transmitted by one call originating operation of the center apparatus 30. In addition, the revised tariff table is alternately set in the E²PROMs 26A and 26B, and the E²PROMs 26A and 26B storing the tariff tables to be referred to are changed at the time for change. However, the current and revised tariff tables may be permanently stored in the E²PROMs 26A and 26B, respectively, and the contents of the E²PROM 26A may be replaced with those of the E²PROM 26B at the time for change, thereby consistently referring to the current tariff table stored in the E²PROM 26A.

As has been described above, according to the present invention, when charging is performed during speech communication in a telephone set, a predetermined current or revised tariff table is selected on the basis of time information of the timepiece unit and change time information transmitted from the center apparatus and stored, thereby determining the tariff. Therefore, the tariff can be simultaneously changed in a large number of telephone sets.

What is claimed is:
1. A public telephone system comprising:
a plurality of public telephone sets for performing a tariff processing as tariff payment processing for a speech communication service in accordance with tariff data obtained on the basis of a calling dial number; and
a center apparatus for transmitting time information, revised tariff information, and change time information to said public telephone sets through a telephone line,
each of said public telephone sets comprising
memory means for storing a current tariff table used in the speech communication service and a revised tariff table constituted by the tariff information from said center apparatus, first timepiece means for setting the time information from said center apparatus to perform a time counting operation, a first data memory for storing the change time information from said center apparatus, determining means for determining whether a current time counted by said first timepiece means reaches change time stored in said first data memory at a time of a call originating operation, and tariff processing means for referring to said current tariff table in said memory means to perform the tariff processing when the current time does not reach the change time and referring to said revised tariff table in said memory means as the current tariff table to perform the tariff processing when the current time reaches the change time on the basis of an output from said determining means, said memory means comprising first and second tariff table memories for selectively storing said current tariff table and said revised tariff table, said public telephone set further comprising a second data memory for storing correlation data between said current and revised tariff tables and said first and second tariff table memories, and said tariff processing means accessing one of said first and second tariff table memories as said current tariff table on the basis of the output from said determining means and the correlation data stored in said second data memory.

2. A system according to claim 1 wherein at least one of said plurality of public telephone sets comprises tariff table setting means for storing the tariff information from said center apparatus in one of said first and second tariff table memories, which is not accessed as said current tariff table, on the basis of the correlation data stored in said second data memory.

3. A system according to claim 1, wherein said center apparatus individually designates said public telephone set to perform a call originating operation, and said public telephone set receives the time information, the revised tariff information, and the change time information in response to a call incoming from said center apparatus.

4. A system according to claim 3, wherein said center apparatus individually transmits the time information, the revised tariff information, and the change time information to said public telephone set in correspondence with the call originating operation, and said public telephone set selectively receives one of the time information, the revised tariff information, and the change time information responding to the call incoming from said center apparatus.

5. A system according to claim 1, wherein said center apparatus comprises input means for individually inputting the time information, the revised tariff information, and the change time information, storage means for storing the revised tariff information and the change time information from said input means, and second timepiece means for setting the time information from said input means to perform a time counting operation, and wherein said center apparatus transmits the information stored in said storage means and information counted by said second timepiece means to at least one of said plurality of public telephone sets.

6. A system according to claim 1, wherein said center apparatus transmits the time information while correcting the current time with a time required for transmission.

7. A public telephone set comprising:

memory means for storing a current tariff table used in a speech communication service and a revised tariff table constituted by tariff information transmitted from a center apparatus;

timepiece means for setting time information transmitted from said center apparatus to perform a time counting operation;

a data memory for storing change time information transmitted from said center apparatus;

determining means for determining whether a current time counted by said timepiece means reaches change time stored in said data memory at the time of a call originating operation; and tariff processing means for referring to said current tariff table in said memory means to perform a tariff processing when the current time does not reach the change time and referring to said revised tariff table in said memory means as the current tariff table to perform the tariff processing when the current time reaches the change time on the basis of an output from said determining means, said memory means comprising first and second tariff table memories for selectively storing said current tariff table and said revised tariff table, said public telephone set further comprising a second data memory for storing correlation data between said current and revised tariff tables and said first and second tariff table memories, and said tariff processing means accessing one of said first and second tariff table memories as said current tariff table on the basis of the output from said determining means and the correlation data stored in said second data memory.

8. A system according to claim 7 wherein at least one of said plurality of public telephone sets comprises tariff table setting means for storing the tariff information from said center apparatus in one of said first and second tariff table memories, which is not accessed as said current tariff table, on the basis of the correlation data stored in said second data memory.

9. A public telephone system comprising:

a plurality of public telephone sets for performing a tariff processing as tariff payment processing for a speech communication service in accordance with tariff data obtained on the basis of a calling dial number; and a center apparatus for transmitting time information, revised tariff information, and change time information to said public telephone sets through a telephone line, at least some of said public telephone sets comprising memory means for storing a current tariff table used in the speech communication service and a revised tariff table constituted by the tariff information from said center apparatus, first timepiece means for setting the time information from said center apparatus to perform a time counting operation, a first data memory for storing the change time information from said center apparatus, determining means for determining whether a current time counted by said first timepiece means reaches change time stored in said first data memory at a time of a call originating operation, and tariff processing means for referring to said current tariff table in said memory means to perform the tariff processing when the current time does not reach the change time and referring to said revised tariff table in said memory means as the current tariff table to perform the tariff processing when the current time reaches the change time on the basis of an output from said determining means, said memory means comprising first and second tariff table memories for selectively storing said current tariff table and said revised tariff table, said at least some of said public telephone sets further including a second data memory for storing correlation data between said current and revised tariff tables and said first and second tariff table memories, and said tariff processing means accessing one of said first and second tariff table memories as said current tariff table on the basis of the output from said determining means and the correlation data stored in said second data memory, at least some of said plurality of public telephone sets further comprising tariff table setting means for storing the tariff information from said center apparatus in one of said first and second tariff table memories, which is not accessed as said current tariff table, on the basis of the correlation data stored in said second data memory, said center apparatus further comprising input means for individually inputting the time information, the revised tariff information, and the change time information, storage means for storing the revised tariff information and the change time information from said input means, and second timepiece means for setting the time information from said input means to perform a time counting operation; and wherein said center apparatus transmits the information stored in said storage means and information counted by said second timepiece means to at least one of said plurality of public telephone sets.

* * * * *